(12) United States Patent
Enderle

(10) Patent No.: US 6,182,457 B1
(45) Date of Patent: Feb. 6, 2001

(54) ELECTRONIC VARIABLE ORIFICE TUBE AND SYSTEM FOR USE THEREWITH

(75) Inventor: Brian Enderle, Dublin, OH (US)

(73) Assignee: Ranco Incorporated of Delaware, Wilmington, DE (US)

( * ) Notice: Under 35 U.S.C. 154(b), the term of this patent shall be extended for 0 days.

(21) Appl. No.: 09/324,461

(22) Filed: Jun. 2, 1999

(51) Int. Cl.$^7$ .................................................. F25B 41/04
(52) U.S. Cl. .............................. 62/222; 62/511; 62/528; 251/129.21; 137/513.3
(58) Field of Search .............................. 62/204, 205, 206, 62/210, 211, 212, 222, 223, 224, 225, 527, 528, 504, 511; 236/92 B; 251/129.01, 129.15, 129.21; 137/110, 513.3

(56) References Cited

U.S. PATENT DOCUMENTS

| | | | |
|---|---|---|---|
| 4,009,592 | * | 3/1977 | Boerger ................................... 62/222 |
| 4,394,816 | * | 7/1983 | Voorhis ................................... 62/205 |
| 4,840,039 | * | 6/1989 | Takai ................................... 62/204 X |
| 5,186,021 | * | 2/1993 | Keller ................................... 62/511 |
| 5,715,704 | | 2/1998 | Cholkeri et al. ........................ 62/527 |

* cited by examiner

Primary Examiner—Harry B. Tanner
(74) Attorney, Agent, or Firm—John M. England, Jr.; Jules Jay Morris; Terrence Terry Martin

(57) ABSTRACT

An electronic variable orifice tube suitable for use as an expansion valve in a refrigeration system providing two flow rates in response to electronic control signals comprises a bodytube, a restrictor mounted within the bodytube and defining a first flowpath. A plunger is translatably positioned within the bodytube in proximity to the restrictor and defines a second and a third flowpath. A valve actuator is functionally coupled to the plunger to translate the plunger within the bodytube to transition between the two flow rates. A high flowpath is formed through the bodytube by the first, second, and third flowpaths, and a low flowpath is formed through the bodytube by the first and the second flowpaths to the exclusion of the third flowpath. A solenoid may be used as the valve actuator and a spring may be employed to return the plunger to its quiescent state when the solenoid is not energized.

24 Claims, 5 Drawing Sheets

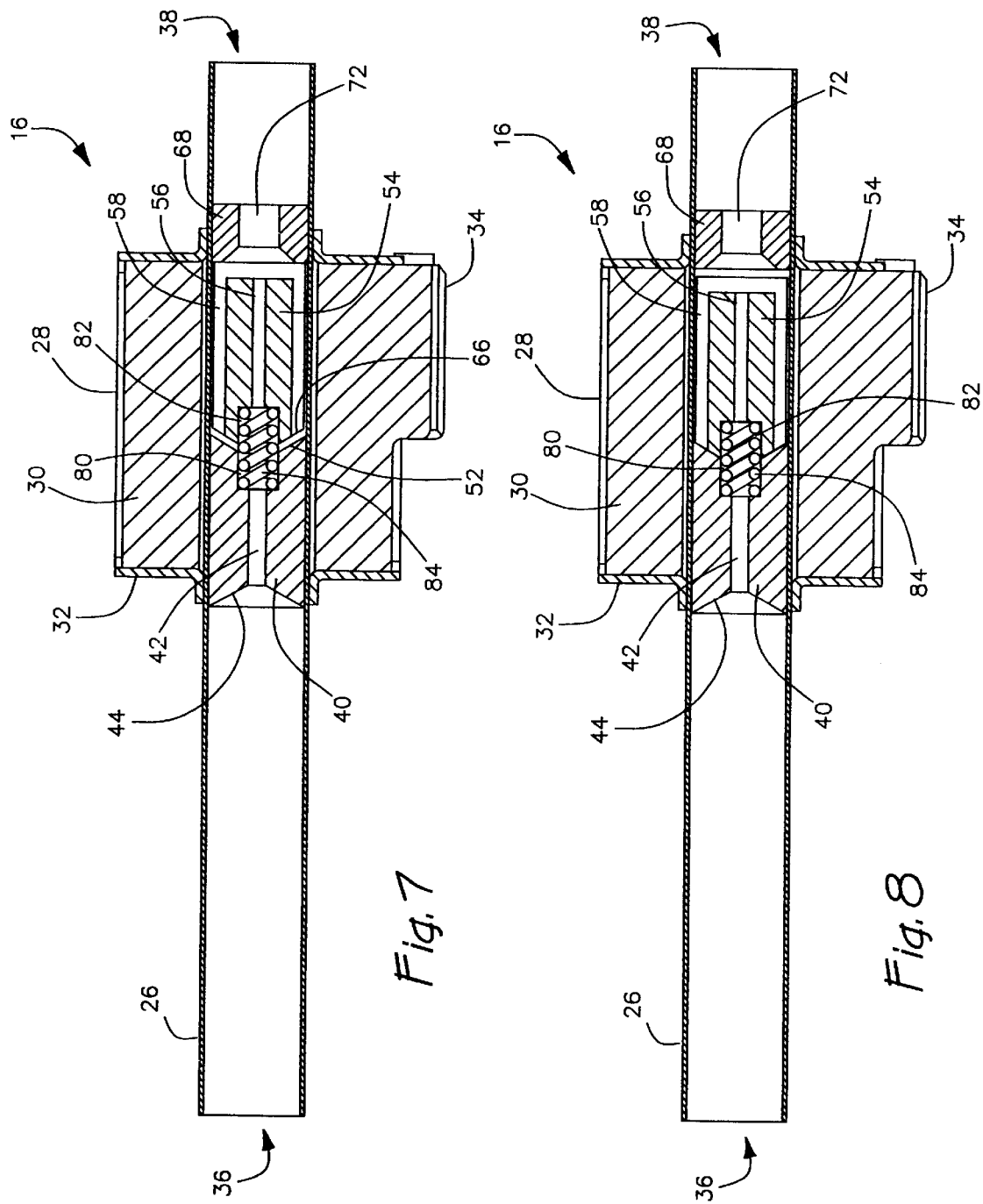

ELECTRONIC VARIABLE ORIFICE TUBE AND SYSTEM FOR USE THEREWITH

FIELD OF THE INVENTION

The instant invention relates to refrigeration systems and their components, and more particularly to a multi-stage, variable orifice expansion valve for use therein.

BACKGROUND OF THE INVENTION

A typical compressor based refrigeration system is a closed fluid circuit through which a refrigerant flows, changing from liquid to gaseous state and back, absorbing and giving up heat during the process. Such a typical system utilizes a compressor in series with a condenser, expansion valve, and evaporator. As is known, the system operates as gaseous refrigerant is compressed by the compressor and is passed to the condenser. Within the condenser the highly pressurized refrigerant gives up heat, typically to the outside environment, as it condenses to liquid form. This condensed liquid refrigerant next passes through an expansion valve which serves as a refrigerant flow control device. This expansion valve allows the compressed liquid refrigerant to experience a sudden drop in pressure causing it to cool and expand, returning to a gaseous state as it absorbs heat as it flows through the evaporator. A typical refrigeration system includes a fan within the environment to be cooled which blows the ambient air across the evaporator where it is cooled. In such a typical system, the compressor can work at a fairly constant level which allows the use of a fixed orifice expansion valve to maintain a fairly constant refrigerant flow therethrough.

While such typical refrigeration systems may operate at a fairly constant level, some application installations for refrigeration systems demand that they operate under widely varying conditions. One such application is for a refrigeration system installed in a motor vehicle. In such an application, the compressor is typically driven by a belt coupled to the motor vehicle's engine. Since the motor vehicle's engine speed differs significantly over the course of its operation, the drive input to the compressor also varies resulting in a change in the overall performance of the refrigeration system itself. In addition to the change in the system performance caused by the differing drive input to the compressor, the amount of refrigerant cooling provided by the air flow directed across the condenser also varies as the motor vehicle is driven at highway speeds or is stopped in rush hour traffic. This too alters the refrigeration system's ability to operate in this environment.

Despite these significant changes in the operating characteristics of a motor vehicle's refrigeration system, past systems still utilized a fixed orifice expansion valve to control the refrigerant flow through the system. A typical orifice size for this fixed or single stage expansion valve is 60 thousandths of an inch. In such a system, when the motor vehicle is driven at highway speeds the air conditioning system is able to provide very cold air to the passenger compartment. However, when the vehicle enters the city, the air coming from the air conditioning vents no longer feels very cold and may, in fact, be warmer than the air within the passenger compartment.

To overcome this problem, the assignee of the instant invention invented and patented a REFRIGERATION SYSTEM FLOW CONTROL EXPANSION VALVE, U.S. Pat. No. 5,715,704 which issued to Cholkeri et al. on Feb. 10, 1998, the teachings and disclosure of which are hereby incorporated by reference. The invention of Cholkeri et al. '704 is a two-stage expansion valve capable of providing differing flow therethrough based upon system conditions. The expansion valve of Cholkeri et al. '704 includes a valve body having a valve inlet for accepting refrigerant and a valve outlet for delivering refrigerant that has passed through the valve body. The valve body includes a metering head that defines first and second passageways for fluid passing through the valve body. A valving element is mounted for controlled movement within the valve body and includes a valve element passageway which, in combination with the first and the second passageways in the metering head, conveys refrigerant through the valve body to the valve outlet. A valve actuator mounted to the valve body moves the valving element to a position for restricting refrigerant flow through one passageway of the first and second passageways while allowing refrigerant to flow through the other of the first and second passageways. The valve actuator includes a control input responsive to an external control signal to control positioning of the valving element itself.

The nature of the signal at the control input of the expansion valve of Cholkeri et al. '704 depends upon the manner in which refrigeration flow is regulated. In certain applications it is sufficient to regulate flow between high and low flow rates at periodic intervals based upon a monitored parameter. For a motor vehicle, for example, the monitored parameter could be engine speed, motor vehicle speed, or compressor head pressure. Any of these going below a threshold could be used to control refrigerant flow rates. In other applications a controlled frequency pulse width modulated signal could be applied at the control input. In such an application a greater control over refrigerant flow is provided by controlling the duty cycle of the control signal, which maintains a greater degree of control over refrigerant flow.

In the exemplary application of a motor vehicle system, the two-stage expansion valve of Cholkeri et al. '704 operates in a de-energized state which corresponds to a high refrigerant flow through the first and second passageways of the metering head to provide optimum cooling during highway operation conditions. When the motor vehicle operates within the city in stop and go traffic, the expansion valve of Cholkeri et al. '704 is energized to prevent refrigerant flow through one of the first and second passages resulting in a reduced refrigerant flow therethrough. It has been found by the assignee of the instant invention that such reduced flow optimizes the cooling capability of the refrigeration system under these conditions. As an example, the high flow or de-energized state could provide an effective 60 thousandths of an inch diameter flowpath for the refrigerant. In the energized or low flow state the effective orifice size could be reduced to 40 thousandths of an inch, as an example.

While the two-stage valve of Cholkeri et al. '704 presents a significant performance advantage for refrigeration systems which experience varying operating parameters, its construction details make it an expensive and difficult assembly to manufacture. Specifically, from a parts count standpoint the valve of Cholkeri et al. '704 includes an inlet and a metering head to provide the first and second flowpaths, a moveable sleeve valving element, a moveable magnetic member to move the sleeve, and a valve outlet in addition to the valve housing and various other minor parts such as bumpers and sealing gaskets. In addition to the high number of parts required to construct the valve of Cholkeri et al. '704, the manufacturing tolerancing of the components also presents a challenge. Specifically, the Cholkeri et al. '704 valve includes a total of five orifices which must be drilled to form the refrigerant flowpaths for the high flow state. To maintain the overall effective orifice size of, for example, 60 thousandths of an inch, the additive tolerance for each of the five holes must be considered and regulated very closely. While the performance of the Cholkeri et al. '704 valve is outstanding, these elements all combine to increase the cost of manufacturing these valves to an undesirably high level.

SUMMARY OF THE INVENTION

It is therefore an object of the instant invention to provide a new and improved multi-stage expansion valve overcoming the above-described and other problems existing in the art. More specifically, it is an object of the instant invention to provide a multi-stage expansion valve which is controllable to provide a variable effective orifice size allowing for optimization of the cooling system under varying operating conditions. It is a further object of the instant invention to provide a multi-stage expansion valve which has a reduced part count, is highly reliable, and has a resultant low cost. Additionally, it is an object of the instant invention to provide a multi-stage expansion valve which is simple to tolerance and easy to manufacture. It is a further object of the instant invention to provide a multi-stage expansion valve which is capable of electronic control providing at least a high flow and a low flow state, and preferably variable flow rates therebetween.

In view of these objects it is the feature of the instant invention to provide an electronic solenoid controlled two-stage expansion valve for use in a refrigeration system. It is a further feature of the instant invention that the expansion valve may be operated to provide a low flow state, a high flow state, and variable flow states therebetween. It is a further feature of the instant invention that the expansion valve may be operated in discreet fashion providing the low flow or alternatively high flow state. Further, it is a feature of the instant invention that the valve may be operated in a pulse width modulated fashion resulting in refrigerant flow through an effective orifice which may be varied from the low flow to the high flow state.

In a preferred embodiment of the instant invention an electronic variable orifice tube comprises a bodytube having an inlet and an outlet and a restrictor fixably mounted within an inner periphery of the bodytube. The restrictor preferably defines a first flowpath therethrough. The tube further comprises a plunger translatably positioned within the inner periphery in proximity to the restrictor, and defines a second and a third flowpath therethrough. A valve actuator is functionally coupled to the plunger to translate the plunger within the bodytube. In this embodiment a high flowpath is formed through the bodytube by the first, second, and third flowpaths, and a low flowpath is formed through the bodytube by the first and the second flowpaths to the exclusion of the third flowpath. Translation of the plunger varies an overall flowpath from the inlet to the outlet between the high flowpath and the low flowpath.

Preferably, the first flowpath and the second flowpath are formed along a first axis through the bodytube, and the third flowpath is formed along a second axis through the bodytube. In this embodiment the plunger is laterally displaced from the restrictor forming a gap which allows fluid communication between the first and the third flowpaths. Alternatively, an end surface of the plunger and an end surface of the restrictor are in contact resulting in the first flowpath being in fluid communication with the second flowpath, and the third flowpath being isolated from fluid communication with the first flowpath.

In a highly preferred embodiment, the actuator is a solenoid mounted on an outer periphery of the body tube providing the functional coupling by a magnetic field generated by energization of the solenoid. A spring is positioned between the restrictor and the plunger and prevents contact between the restrictor and the plunger in a quiescent state. The magnetic field causes translation of the plunger resulting in compression of the spring and contact of the plunger and the restrictor. thus forming the low flowpath. The high flowpath is formed as the spring translates the plunger away from the restrictor upon de-energization of the solenoid.

The spring may be accommodated in a reduced diameter portion of the restrictor or the plunger which forms, in conjunction with an inner diameter of the bodytube, a spring cavity for housing at least a portion of the spring. In this embodiment, the plunger preferably defines at least one flute in its outer periphery running a length of the plunger to provide pressure equalization between the spring cavity and the outlet. Alternatively, at least one of the restrictor or plunger defines a central spring well for housing at least a portion of the spring.

In a preferred embodiment, a cross-sectional area of the first flowpath controls a flow of fluid through the bodytube for the high flowpath, and the cross-sectional area of the second flowpath controls the flow of fluid through the bodytube for the low flowpath. The electronic variable orifice tube of a preferred embodiment further comprises an end stop fixably mounted within the inner periphery of the bodytube and defines a passage through it. The plunger is positioned between the restrictor and the end stop.

An alternate preferred embodiment of the instant invention forms an expansion valve for use in a refrigeration system having a compressor, a condenser, an evaporator, and a refrigeration system controller monitoring parameters of the refrigeration system. The expansion valve is installed within the refrigeration system to control refrigerant flow from the condenser to the evaporator at least two levels. The valve comprises a bodytube having an inlet for receiving refrigerant from the condenser and an outlet for conveying refrigerant to the evaporator, and a restrictor mounted within the bodytube. The restrictor has a first end and a second end and defining a first flowpath from the first end to the second end, and prevents refrigerant flow through the bodytube other than through the first flowpath. A plunger is translatably mounted within the bodytube and has a third and a fourth end. The third end is profiled to mate with the second end of the restrictor. The plunger includes a second flowpath positioned a common axis with the first flowpath, and a third flowpath. The refrigerant flowpath from the inlet to the outlet traverses the first, second, and third flowpaths when the second end of the restrictor and the third end of the plunger are not in contact, and traverses the first and the second flowpaths when the second end of the restrictor and the third end of the plunger are in contact.

In a preferred embodiment, the plunger comprises a ferromagnetic material and a solenoid is included and mounted on the bodytube in proximity to the plunger. This solenoid generates a magnetic field when energized which acts to laterally translate the plunger within the bodytube. Preferably, the solenoid laterally translates the plunger such that the third end of the plunger comes into contact with the second end of the restrictor, thereby substantially preventing refrigerant flow to the third flowpath. The solenoid further generates a magnetic force sufficient to maintain substantially sealing contact between the second end of the restrictor and the third end of the plunger.

A preferred expansion valve further comprises a spring interposed between the restrictor and the plunger separating the second end of the restrictor from the third end of the plunger in the absence of solenoid energization. In one embodiment at least one of the restrictor and the plunger includes a reduced diameter portion to accommodate at least a portion of the spring. The plunger further defines a least one flute in its outer periphery to provide fluid communication between the reduced diameter portion of the restrictor and the fourth end of the plunger when the second end of the restrictor is in contact with the third end of the plunger. Alternatively, at least one of the restrictor and the plunger defines a spring well to accommodate at least a portion of the spring.

As contemplated herein, a refrigeration system having at least two refrigerant flow rates in accordance with the teachings of the instant invention comprises a compressor, a condenser in fluid communication with the compressor, an electronic variable orifice tube in fluid communication with the condenser, an evaporator in fluid communication with the electronic variable orifice tube and the compressor, and a refrigeration system controller electrically coupled to the electronic variable orifice tube. Preferably, the electronic variable orifice tube comprises a bodytube having an inlet and an outlet, a restrictor fixably mounted within an inner periphery of the bodytube defining a first flowpath, a plunger translatably positioned within the inner periphery in proximity to the restrictor defining a second and a third flowpath, and a valve actuator functionally coupled to the plunger to translate the plunger between a first and a second position within the bodytube forming a high flowpath through the bodytube by the first, second, and third flowpaths in the first position, and a low flowpath through the bodytube by the first and the second flowpaths to the exclusion of the third flowpath in the second position.

These and other aims, objectives, and advantages of the invention, will become more apparent from the following detailed description while taken into conjunction with the accompanying drawings.

BRIEF DESCRIPTION OF THE INVENTION

FIG. 7 is a cross-sectional illustration of a further alternate embodiment of an electronic variable orifice tube of the instant invention in a high flow state;

FIG. 8 is a cross-sectional illustration of the further alternate embodiment of an electronic variable orifice tube illustrated in FIG. 7 in a low flow state;

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENT

Figure 1:
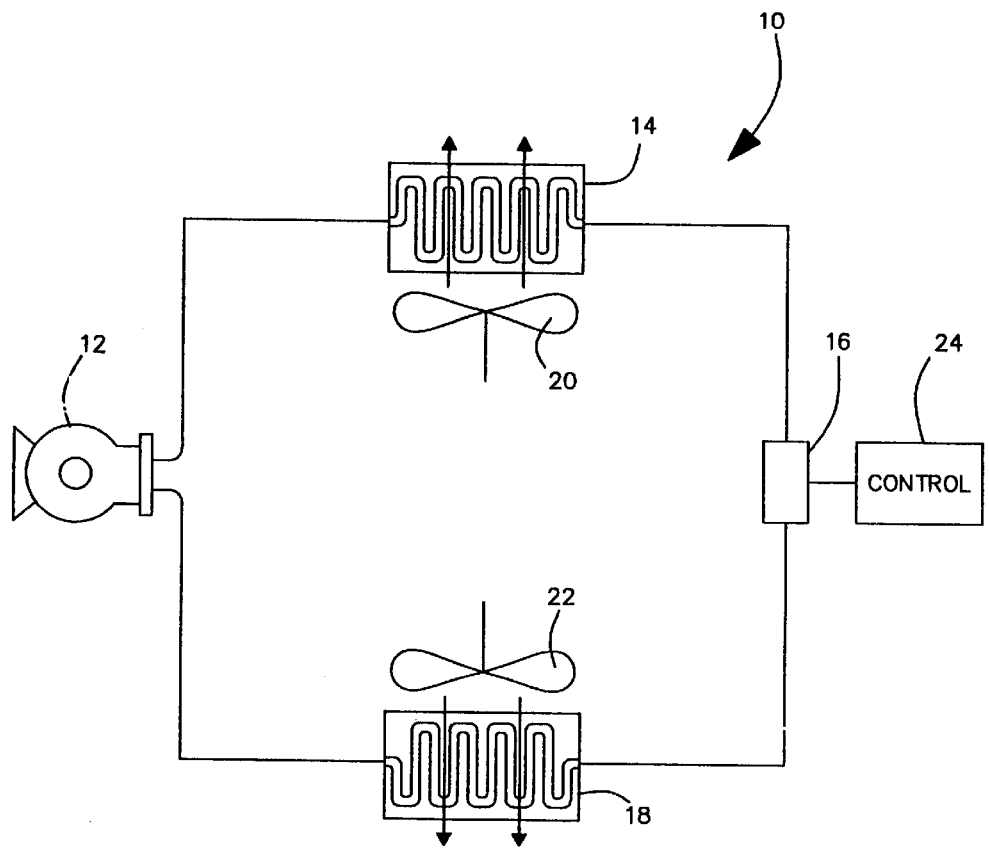
FIG. 1 is a schematic representation of a refrigeration system embodying an electronic variable orifice tube constructed according to the teachings of the instant invention.

A compressor based refrigeration system 10 constructed in accordance with the teachings of the instant invention is illustrated in schematic representation in FIG. 1. While this system 10 may be installed in various applications, it is particularly well suited to installation within a motor vehicle to serve as the vehicle's air conditioning system. In such an installation, the system 10 comprises a hermetic circuit containing a refrigerant such as R134A. This system 10 utilizes a compressor 12, a condenser 14, an electronic variable orifice tube 16, and an evaporator 18. In a typical automotive installation the condenser 14 is mounted within the engine compartment, typically near the radiator so that airflow entering the engine compartment through the grill may pass through the condenser 14 to extract heat therefrom. During periods when the air flow through the engine compartment is insufficient to remove the required amount of heat from the condenser 14, a fan 20 may be turned on to assist air flow through the condenser 14. While the condenser 14 is typically mounted within the engine compartment of a motor vehicle, the evaporator 18 is typically located within the dash of the passenger compartment of the vehicle. A fan 22 is typically employed to force air through the evaporator 18 and into the passenger compartment to cool same. The control of fans 20 and 22 is conventional as is known in the art.

Figure 2:
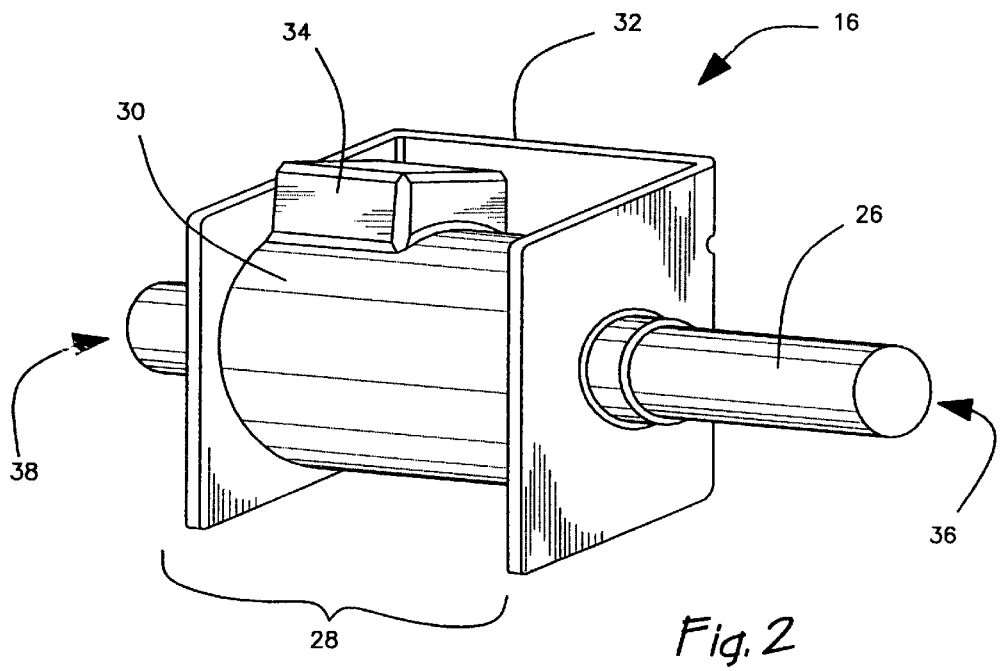
FIG. 2 is an isometric illustration of an electronic variable orifice tube expansion valve of an embodiment of the instant invention.

During operation the compressor 12 compresses the gaseous refrigerant flowing from the evaporator 18 and delivers it to the condenser 14. The condenser 14 transfer heat from the compressed refrigerant flowing through it to the atmospheric air so that the refrigerant condenses in the condenser 14. In a typical system 10 the liquefied refrigerant collects at the discharge end of the condenser 14 before entering the electronic variable orifice tube 16 through which the refrigerant flow to the evaporator 18 is controlled. The refrigerant flow-controlling electronic variable orifice tube 16 alters the refrigerant flow rate from the condenser 14 to the evaporator 18 according to refrigeration system operating parameters monitored by an electronic variable orifice tube controller 24 to assure efficient system operation. As will be described more fully hereinbelow, the electronic variable orifice tube 16 of the instant invention regulates refrigerant flow into the evaporator 18 between a minimum low flow condition and a maximum high flow condition based upon inputs from controller 24. These sensed conditions may include engine rpm, vehicle speed, head pressure of the compressor, etc. The electronic variable orifice tube 16 of the instant invention is isometrically illustrated in FIG. 2, to which specific reference is now made. As may be seen an embodiment of the electronic variable orifice tube 16 of the instant invention includes a bodytube 26 having mounted thereon an electronic valve actuator 28. The actuator 28 includes a solenoid 30 and a coil frame 32. The actuator 28 also includes an electrical connector 34 to which the controller 24 (see FIG. 1) is coupled. As described briefly above, this controller 24 varies the flow through the electronic variable orifice tube 16 of the instant invention from the inlet 36 of bodytube 26 to its outlet 38.

Figure 3:
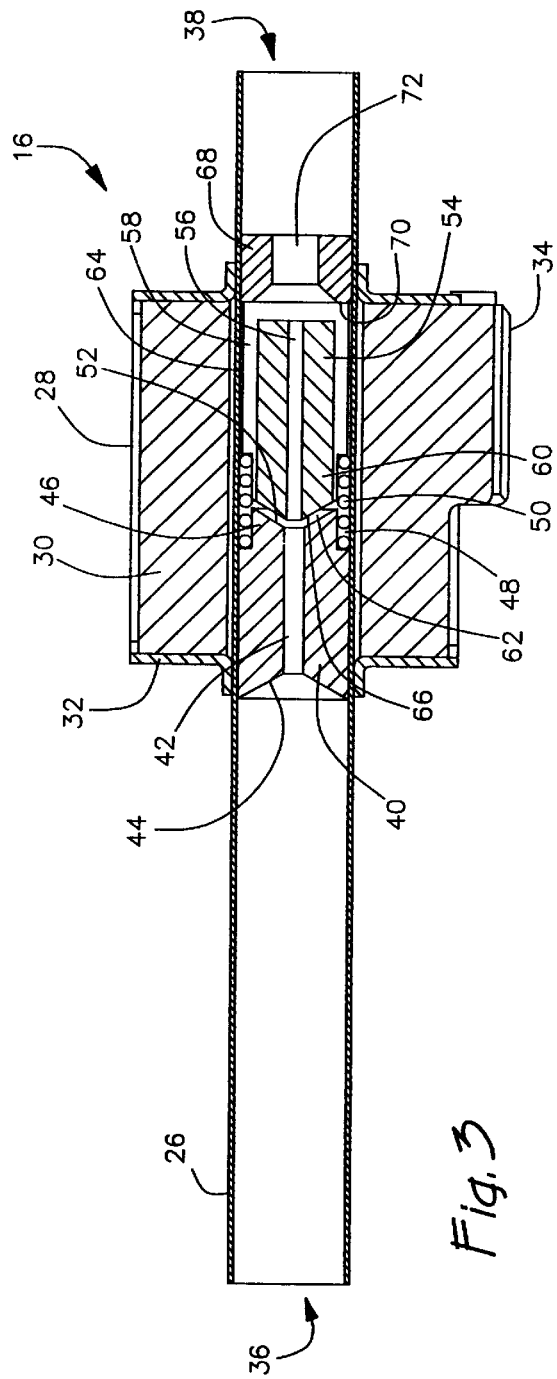
FIG. 3 is a cross-sectional illustration of an embodiment of the electronic variable orifice tube of the instant invention in a high flow state.

A cross section of an embodiment of the electronic variable orifice tube 16 of the instant invention is illustrated in FIG. 3. As may be seen from this cross-sectional illustration, the electronic variable orifice tube 16 includes within the bodytube 26 a restrictor 40 defining therein a flowpath 42 for communication of refrigerant therethrough. Preferably, the inlet of restrictor 40 defines a conical face 44 to aid in the flow of refrigerant into flowpath 42. However, as will be recognized by one skilled in the art, this inlet side of restrictor 40 may be of other geometries such as, for example, a flat surface. The restrictor 40 is preferably fixable attached within the bodytube 26 by methods known in the art such as, for example, through laser welding, roll crimping, etc.

The flowpath 42 may be machined into the restrictor 40 with such a dimension to control the flow of coolant through the tube 16 during the high flow condition. An exemplary flowpath dimension for application in a refrigeration system for a motor vehicle such as that illustrated in FIG. 1 may be 60 thousandths of an inch, although other dimensions may be appropriate based upon the system requirements for high coolant flow. While the restrictor 40 may be of any suitable material, preferably it is constructed from a ferromagnetic material, preferably grade 430 stainless steel, although those skilled in the art will recognize that other materials may be appropriate. As may be seen, the outlet end (the end near outlet 38) includes a reduced outer diameter portion 46 which, in conjunction with the inner diameter of bodytube 26, forms a spring groove 48 into which a helical spring 50 is accommodated. In a preferred embodiment of the instant invention, the outlet end of restrictor 40 also defines a conical surface 52.

Figure 4:
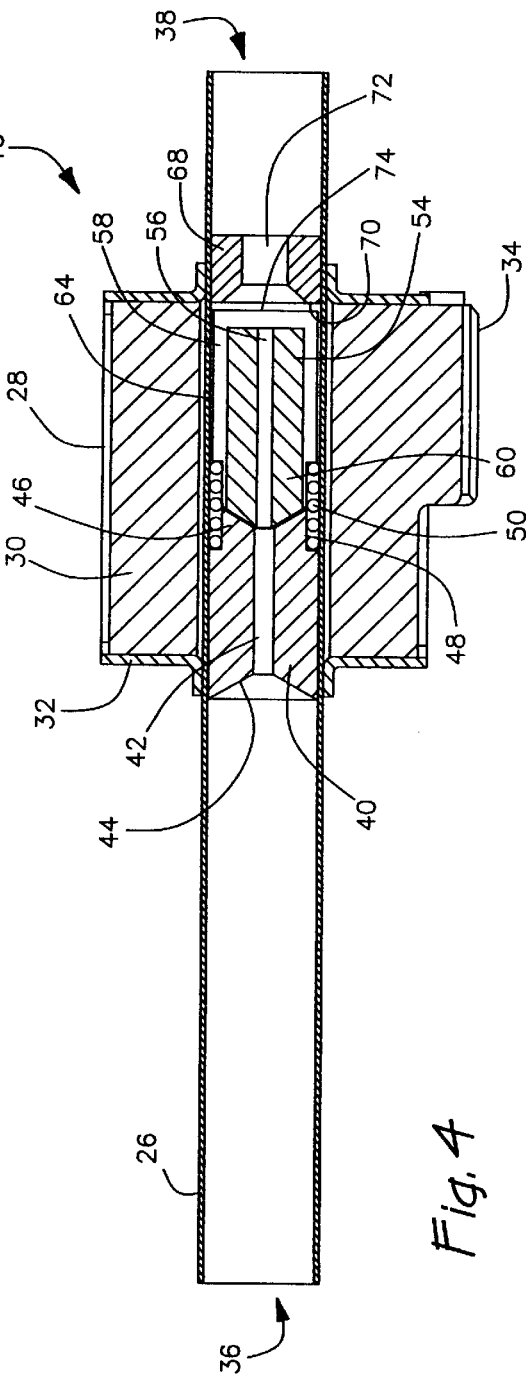
FIG. 4 is a cross-sectional illustration of the embodiment of the electronic variable orifice tube of the instant invention illustrated in FIG. 3 in a low flow state.

The electronic variable orifice tube 16 of the instant invention also includes a mobile plunger 54 slidably positioned within the bodytube 26. This plunger 54 defines a first 56 and a second 58 flowpath therethrough. The first flowpath 56 is dimensioned smaller than the flowpath 42 of restrictor 40, and controls the coolant flow through the electronic variable orifice tube 16 during the low flow condition as will be described more fully hereinbelow with reference to FIG. 4. The plunger 54 also includes a reduced diameter portion 60 at the inlet end (the end nearer inlet 36) which, in conjunction with the inner diameter of bodytube 26, forms a spring groove into which the helical spring 50 is accommodated. This helical spring 50 is of sufficient length such that in its quiescent state the plunger 54 does not contact the outlet end of restrictor 40 defining a flow gap 62 therebetween. The outer diameter of plunger 54 also includes at least one flute 64 therein running the length of plunger 54 from the reduced diameter portion 60 to the outlet end thereof. These flutes 64 allow for pressure equalization between the inlet end and the outlet end of plunger 54 to allow movement thereof within bodytube 26 during operation. As may be seen from this FIG. 3, the inlet end of plunger 54 is profiled to mate with the outlet end of restrictor 40, and in this exemplary embodiment forms an outwardly conical surface 66.

The electronic variable orifice tube 16 of the instant invention also includes an end stop 68 fixable positioned within bodytube 26 near outlet 38. The inlet surface 70 of end stop 68 abuts the outlet surface of mobile plunger 54 thereby preventing further lateral translation thereof. End stop 68 also defines a flowpath 72 therethrough dimensioned larger than flowpath 42 of restrictor 40 so as to allow restrictor 40 to control the flow of refrigerant therethrough during the high flow condition.

As may also be seen from this FIG. 3, the valve actuator 28 includes a solenoid 30 mounted on bodytube 26 by frame 32 in proximity of the restrictor 40 and mobile plunger 54. In this way, the magnetic fields generated by solenoid 30 upon energization may act upon the mobile plunger 54 within bodytube 26.

The embodiment of the electronic variable orifice tube 16 illustrated in FIG. 3 is pictured in the high flow state wherein the refrigerant flow therethrough is controlled by the flowpath 42 of restrictor 40. As refrigerant enters inlet 36 its flow is regulated by flowpath 42 which is dimensioned based upon the high refrigerant flow requirements of the system. As the refrigerant exits flowpath 42 it enters the gap 62 between the restrictor 40 and the mobile plunger 54. From this gap 62 the refrigerant flows through flowpath 56 and 58 without further restriction to the flow rate. The refrigerant then flows through flowpath 72 in end stop 68 to the outlet 38. The dimensioning of all downstream flowpaths (56, 58, and 72) are such that further restriction on the refrigerant flow essentially does not occur. The positioning of the mobile plunger 54 to allow for this high flow condition is preferably maintained by the helical spring 50 with the solenoid 30 in a de-energized state. However, as will be recognized by one skilled in the art, this high flow position of plunger 54 could be maintained by energization of the solenoid through appropriate wiring configuration changes. In such a configuration, the spring 50 would preferably be of the compression type which would maintain contact between the outlet surface 52 of restrictor 40 and inlet surface 66 of moveable plunger 54 in its quiescent state.

When the valve controller 24 (see FIG. 1) determines that a low refrigerant flow condition is required, it energizes solenoid 30 through electrical connector 34. Once energized, solenoid 30 creates a magnetic field which laterally translates the mobile plunger 54, compressing spring 50 and mating with restrictor 40. While energized into this low flow state, all of the refrigerant entering flowpath 42 of restrictor 40 is forced to flow through the first flowpath 56 of the mobile plunger 54. As such, flowpath 56 controls the flow of coolant from inlet 36 to outlet 38. Therefore, this flowpath 56 is dimensioned based upon the low flow requirements of the system into which it is installed. Refrigerant flow through flowpath 58 is substantially prevented by the mating of the mobile plunger 54 with the restrictor 40 thus closing gap 62 (see FIG. 3) which allowed the refrigerant to flow to this flowpath 58.

In this low flow state, one skilled in the art will appreciate the functionality of flutes 64 which provide for pressure equalization between the outlet end 74 of mobile plunger 54 and the spring groove formed by the reduced diameter portions 46 and 60 of the restrictor 40 and mobile plunger 54, respectively. As the mobile plunger 54 is laterally transitioned to mate with the restrictor 40, refrigerant will become trapped in the spring groove. If it were not for the flutes 64 this trapped refrigerant would tend to form a pressure lock prohibiting the mobile plunger 54 from transitioning back to its quiescent state once the solenoid is de-energized. The flutes allow refrigerant to flow into the spring gap as the spring 50 pushes the mobile plunger 54 away from the restrictor 40, equalizing the pressure in the gap and allowing for smooth transition.

Figure 5:
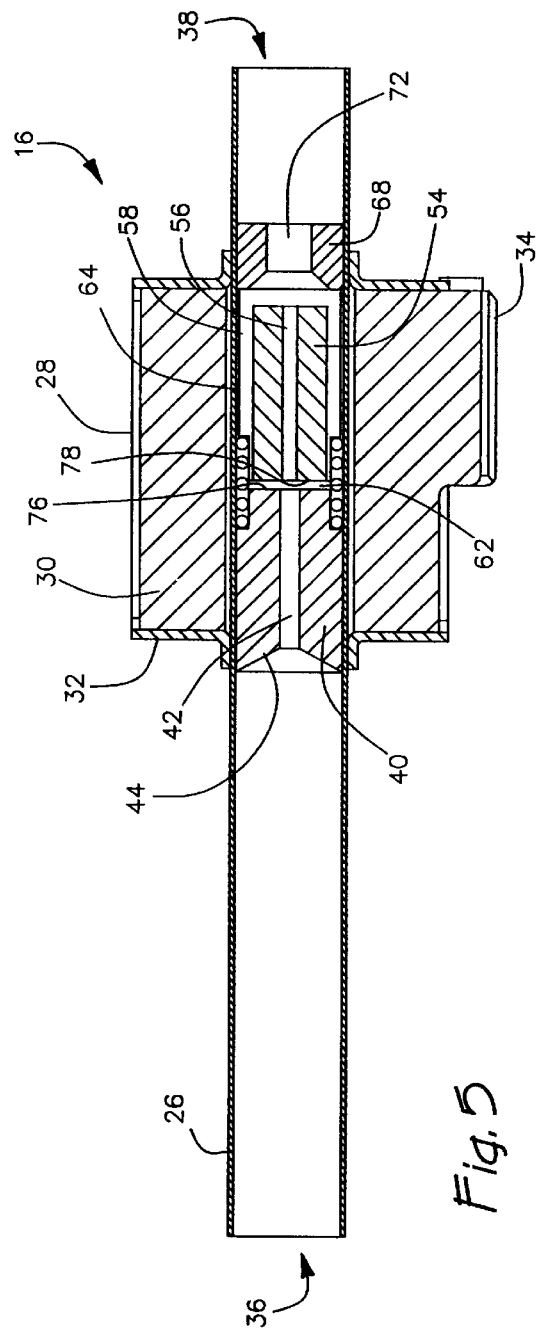
FIG. 5 is a cross-sectional illustration of an alternate embodiment of an electronic variable orifice tube of the instant invention in a high flow state.
Figure 6:
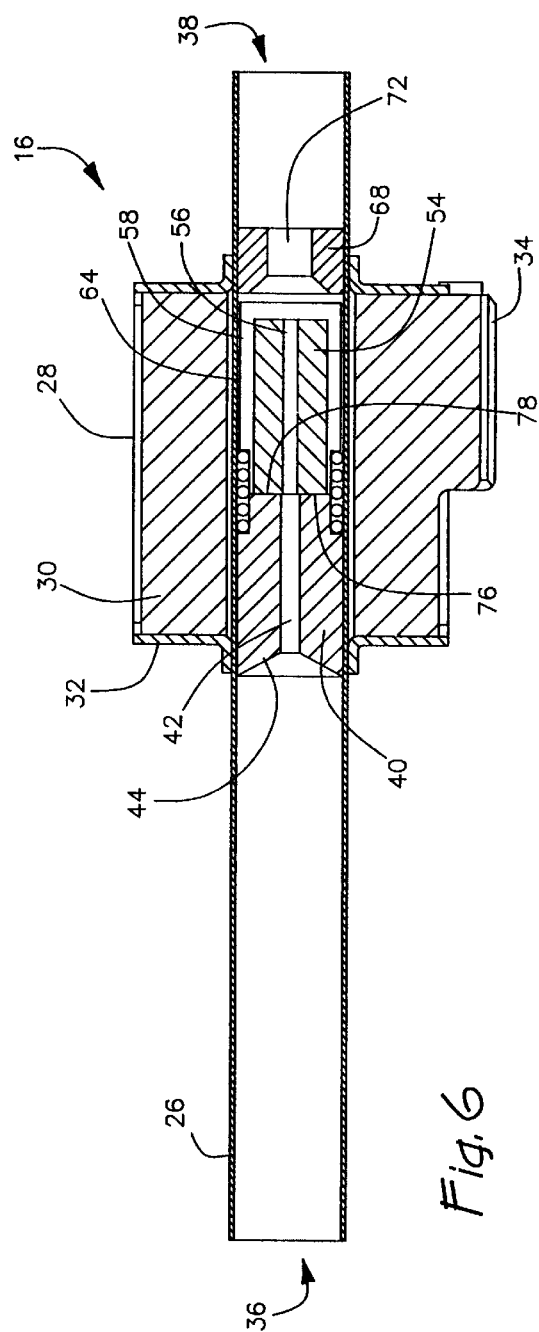
FIG. 6 is a cross-sectional illustration of the alternate embodiment of an electronic variable orifice tube illustrated in FIG. 5 in a low flow state.

An alternate embodiment of the electronic variable orifice tube 16 is illustrated in high flow and low flow states in FIGS. 5 and 6, respectively. As may be seen from this alternate embodiment, the outlet end 76 of restrictor 40 and the inlet end 78 of mobile plunger 54 are both flat surfaces. While the refrigerant flow through the electronic variable orifice tube 16 may be somewhat more turbulent through the gap 62 between the two flat surfaces 76, 78, overall system performance is not degraded thereby. The flat surfaces 76, 78 allow for simplified manufacture of the restrictor 40 and the mobile plunger 54 since the mating conical surfaces do not need to be machined on these parts.

A further alternate embodiment of the electronic variable orifice tube 16 of the instant invention is illustrated in a high flow and low flow state in FIGS. 7 and 8 to which specific reference is now made. As may be seen from these two figures, this embodiment of the electronic variable orifice tube 16 does not include reduced diameter portions 46 and 60 (see FIG. 3) which were required in the previous embodiments to house the helical spring 50 used therein. Instead, a spring cavity 80, 82 is formed in the outlet surface 52 and inlet surface 66 of the restrictor 40 and the mobile plunger 54, respectively. In this embodiment a helical spring 84 is placed within the spring cavities 80, 82 and provides the same functional separation of the restrictor 40 from the mobile plunger 54 as was provided by spring 50 in the above-described embodiments. However, a functional advantage is realized with the interior spring placement based on the amount of material which must be removed from the mobile plunger 54. Specifically, for the same diameter spring less magnetic material needs to be removed from mobile plunger 54 thus allowing for increased response to the solenoid generated magnetic fields during solenoid energization. Further, the center spring placement allows the spring cavities 80, 82 to communicate with the flowpaths 42, 56 such that the flutes 64 required by the previous embodiments for pressure equalization are no longer required. This adds to yet a further reduction of magnetic material which must be removed from the mobile plunger 54 in this embodiment.

Figure 9:
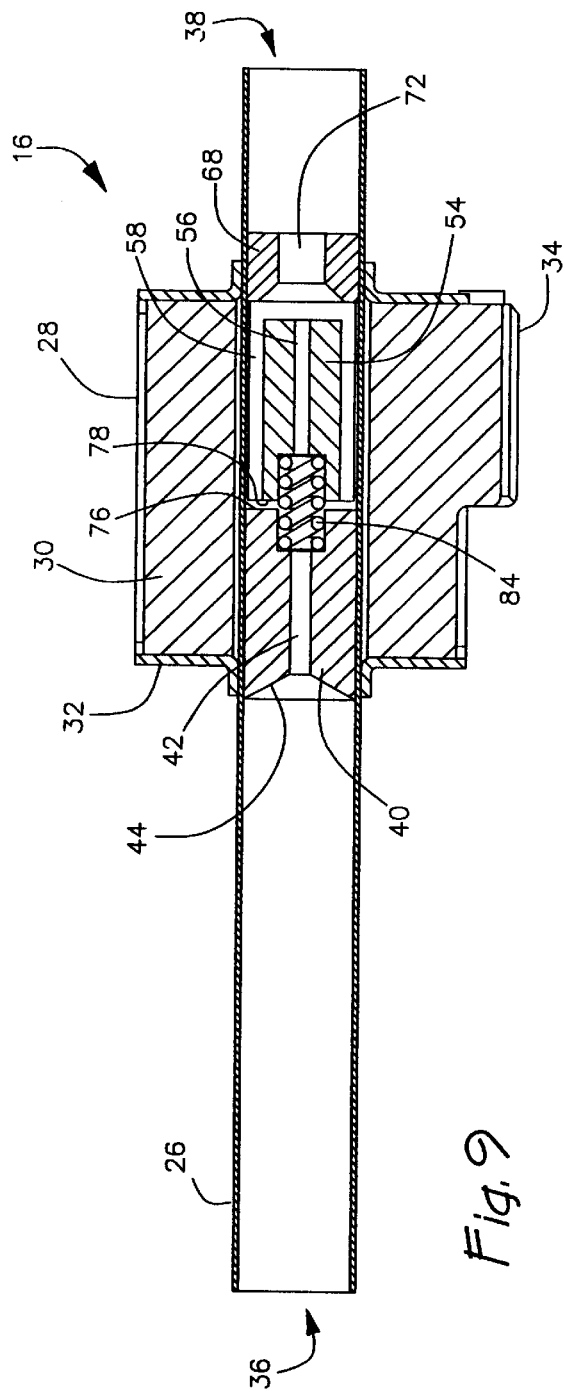
FIG. 9 is a cross section illustration of a yet further embodiment of an electronic variable orifice tube in accordance with the instant invention in a high flow state.
Figure 10:
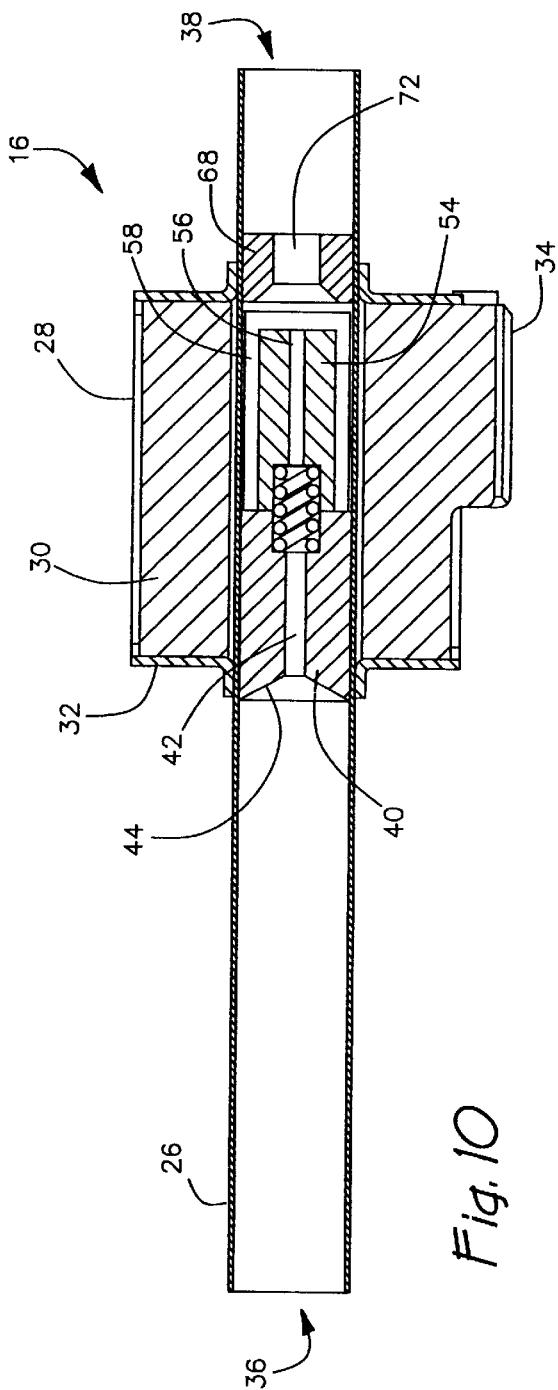
FIG. 10 is a cross-sectional illustration of the yet further alternate embodiment of an electronic variable orifice tube illustrated in FIG. 9 in a low flow state.

Yet another preferred embodiment of the electronic variable orifice tube 16 of the instant invention is illustrated in its high flow and low flow states in FIGS. 9 and 10, respectively. In this embodiment the spring is once again placed within the center of the restrictor 40 and the mobile plunger 54 similar to that illustrated in the embodiments of FIGS. 7 and 8. Unlike the embodiment illustrated in FIG. 7, the embodiment of FIG. 9 utilizes flat contact surfaces 76, 78 as opposed to conical surfaces 52, 66 described above.

Numerous modifications and alternative embodiments of the invention will be apparent to those skilled in the art in view of the foregoing description. Accordingly, this description is to be construed as illustrative only and is for the purpose of teaching those skilled in the art the best mode for carrying out the invention. Details of the structure and implementation of the various components described above can be varied substantially without departing from the spirit of the invention, and exclusive use of all modifications that come within the scope of the appended claims is reserved.

What is claimed is:

1. An electronic variable orifice tube, comprising:
   a bodytube having an inlet and an outlet;
   a restrictor fixably mounted within an inner periphery of said bodytube, said restrictor defining a first flowpath therethrough;
   a plunger translatably positioned within said inner periphery in proximity to said restrictor, said plunger defining a second and a third flowpath therethrough; and
   a valve actuator functionally coupled to said plunger to translate said plunger within said bodytube; and
   wherein a high flowpath is formed through said bodytube by said first, second, and third flowpaths, and a low flowpath is formed through said bodytube by said first and said second flowpaths to the exclusion of said third flowpath; and
   wherein translation of said plunger varies an overall flowpath from said inlet to said outlet between said high flowpath and said low flowpath.

2. The electronic variable orifice tube of claim 1, wherein said first flowpath and said second flowpath are formed along a first axis through said bodytube, and wherein said third flowpath is formed along a second axis through said bodytube.

3. The electronic variable orifice tube of claim 2, wherein said plunger is laterally displaced from said restrictor forming a gap therebetween, and wherein said gap allows fluid communication between said first and said third flowpaths.

4. The electronic variable orifice tube of claim 2, wherein an end surface of said plunger and an end surface of said restrictor are in contact, and wherein said first flowpath is in fluid communication with said second flowpath, and wherein said third flowpath is isolated from fluid communication with said first flowpath.

5. The electronic variable orifice tube of claim 1, wherein said actuator is a solenoid mounted on an outer periphery of said body tube, and wherein said functional coupling is provided by a magnetic field generate by energization of said solenoid.

6. The electronic variable orifice tube of claim 5, further comprising a spring positioned between said restrictor and said plunger, said spring preventing contact between said restrictor and said plunger in a quiescent state.

7. The electronic variable orifice tube of claim 6, wherein said magnetic field causes translation of said plunger resulting in compression of said spring and contact of said plunger and said restrictor, said low flowpath being formed thereby.

8. The electronic variable orifice tube of claim 7, wherein said spring translates said plunger away from said restrictor upon de-energization of said solenoid, said high flowpath being formed thereby.

9. The electronic variable orifice tube of claim 6, wherein said restrictor includes a reduced diameter portion forming in conjunction with an inner diameter of said bodytube a spring cavity for housing at least a portion of said spring.

10. The electronic variable orifice tube of claim 9, wherein said plunger defines at least one flute in an outer periphery thereof running a length of said plunger, said flute providing pressure equalization between said spring cavity and said outlet.

11. The electronic variable orifice tube of claim 6, wherein said plunger includes a reduced diameter portion forming in conjunction with said inner periphery of said bodytube a spring cavity for housing at least a portion of said spring.

12. The electronic variable orifice tube of claim 11, wherein said plunger defines at least one flute in an outer periphery thereof running a length of said plunger, said flute providing pressure equalization between said spring cavity and said outlet.

13. The electronic variable orifice tube of claim 6, wherein said restrictor defines a central spring well for housing at least a portion of said spring.

14. The electronic variable orifice tube of claim 1, wherein a cross-sectional area of said first flowpath controls a flow of fluid through said bodytube for said high flowpath, and wherein a cross-sectional area of said second flowpath controls said flow of fluid through said bodytube for said low flowpath.

15. The electronic variable orifice tube of claim 1, further comprising an end stop fixably mounted within said inner periphery of said bodytube and defining a passage therethrough, said plunger being positioned between said restrictor and said end stop.

16. An expansion valve for use in a refrigeration system having a compressor, a condenser, an evaporator, and a refrigeration system controller monitoring parameters of the refrigeration system, the expansion valve being installed within the refrigeration system to control refrigerant flow from the condenser to the evaporator, comprising:

a bodytube having an inlet for receiving refrigerant from the condenser and an outlet for conveying refrigerant to the evaporator;

a restrictor mounted within said bodytube, said restrictor having a first end and a second end and defining a first flowpath therethrough from said first end to said second end, said restrictor preventing refrigerant flow through said bodytube other than through said first flowpath;

a plunger translatably mounted within said bodytube and having a third and a fourth end, said third end being profiled to mate with said second end of said restrictor, said plunger defining a second flowpath therethrough and positioned therein along a common axis with said first flowpath, said plunger further defining a third flowpath therethrough; and wherein a refrigerant flowpath from said inlet to said outlet traverses said first, second, and third flowpaths when said second end of said restrictor and said third end of said plunger are not in contact, and traverses said first and said second flowpaths when said second end of said restrictor and said third end of said plunger are in contact.

17. The expansion valve of claim 16, wherein said plunger comprises a ferromagnetic material, further comprising a solenoid mounted on said bodytube in proximity to said plunger, said solenoid generating a magnetic field when energized which acts to laterally translate said plunger within said bodytube.

18. The expansion valve of claim 17, wherein said solenoid laterally translates said plunger such that said third end of said plunger comes into contact with said second end of said restrictor, thereby substantially preventing refrigerant flow to said third flowpath.

19. The expansion valve of claim 18, wherein said solenoid generates a magnetic force sufficient to maintain substantially sealing contact between said second end of said restrictor and said third end of said plunger.

20. The expansion valve of claim 18, further comprising a spring interposed between said restrictor and said plunger separating said second end of said restrictor from said third end of said plunger in the absence of solenoid energization.

21. The expansion valve of claim 20, wherein at least one of said restrictor and said plunger includes a reduced diameter portion to accommodate at least a portion of said spring.

22. The expansion valve of claim 21, wherein said plunger further defines a least one flute in an outer periphery thereof, said flute providing fluid communication between said reduced diameter portion of said restrictor and said fourth end of said plunger when said second end of said restrictor is in contact with said third end of said plunger.

23. The expansion valve of claim 20, wherein at least one of said restrictor and said plunger defines a spring well to accommodate at least a portion of said spring.

24. A refrigeration system having at least two refrigerant flow rates, comprising:

a compressor;

a condenser in fluid communication with said compressor;

an electronic variable orifice tube in fluid communication with said condenser;

an evaporator in fluid communication with said expansion valve and said compressor; and a refrigeration system controller electrically coupled to said electronic variable orifice tube; and wherein said electronic variable orifice tube, comprises a bodytube having an inlet and an outlet, a restrictor fixably mounted within an inner periphery of said bodytube, said restrictor defining a first flowpath therethrough;

a plunger translatably positioned within said inner periphery in proximity to said restrictor, said plunger defining a second and a third flowpath therethrough; and a valve actuator functionally coupled to said plunger to translate said plunger between a first and a second position within said bodytube forming a high flowpath through said bodytube by said first, second. and third flowpaths in said first position, and a low flowpath through said bodytube by said first and said second flowpaths to the exclusion of said third flowpath in said second position.

* * * * *